United States Patent Office 3,514,777
Patented May 26, 1970

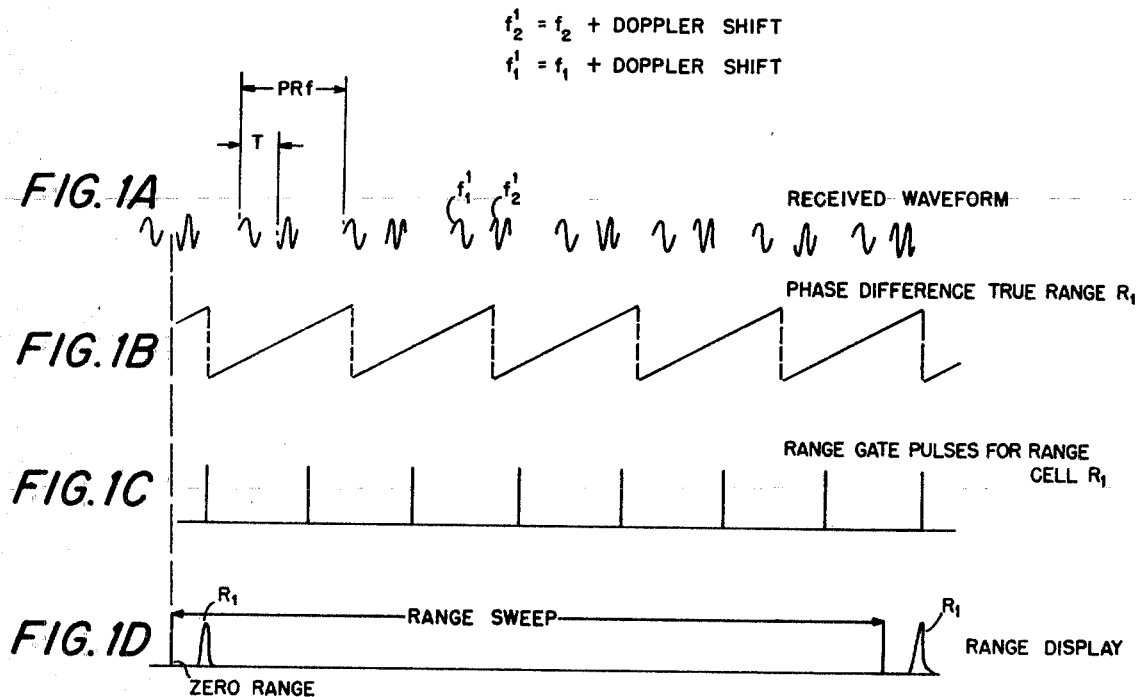
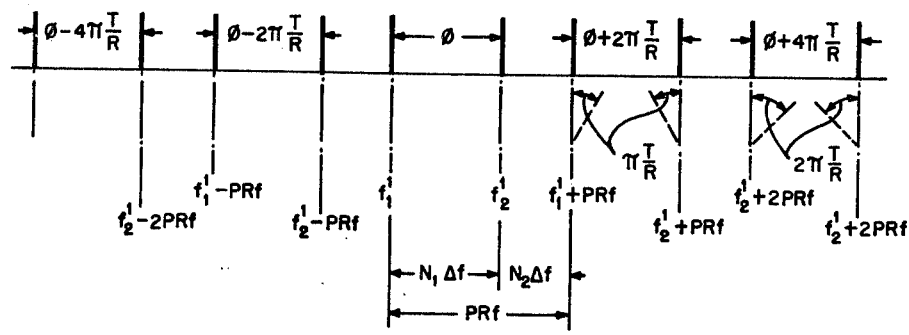

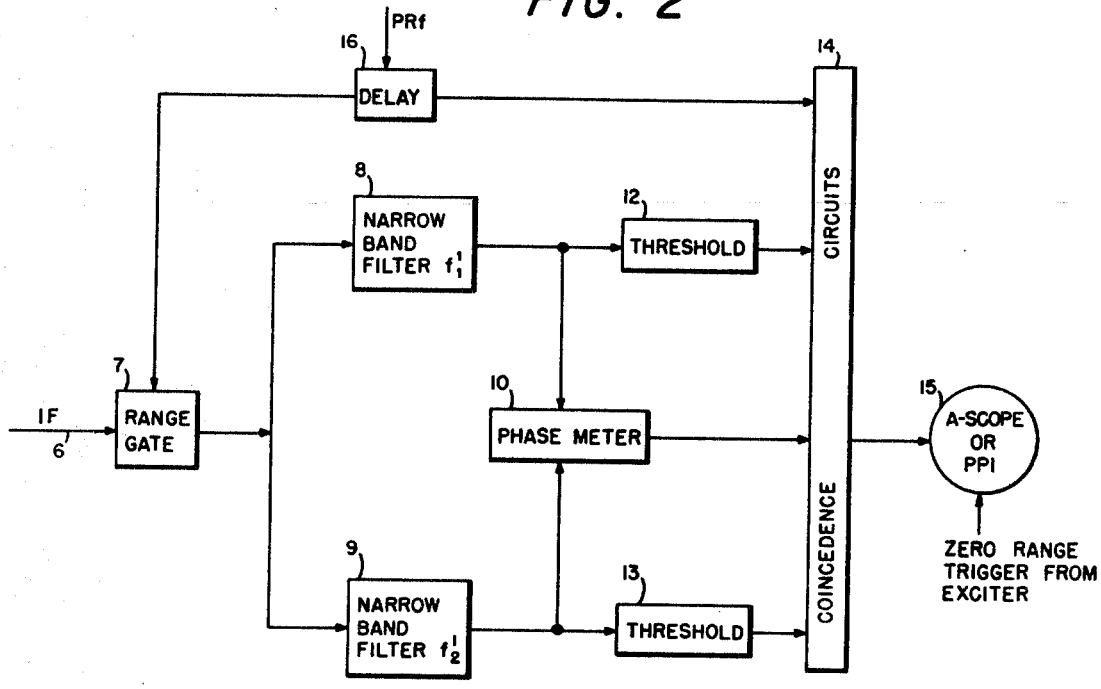

3,514,777
PULSE DOPPLER RADAR WITH REDUCED RANGE AND DOPPLER AMBIGUITIES
Hermann H. Woerrlein, Dunkirk, Md., assignor to the United States of America as represented by the Secretary of the Navy
Filed Nov. 29, 1968, Ser. No. 780,138
Int. Cl. G01s 9/06, 9/44
U.S. Cl. 343—9   7 Claims

ABSTRACT OF THE DISCLOSURE

A pulse echo detection system capable of providing unambiguous range and Doppler data in a pulse Doppler system. The system utilizes pulses modulated on different carriers at the same pulse rate frequency. By processing the staggered spectra resulting from the different carriers in separate channels and utilizing the phase difference between lines in each of the spectra, a display of unambiguous target range and Doppler is made possible.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to pulse burst or pulse Doppler radar systems. The outstanding advantage of such systems is their capacity of yielding combined range and Doppler information. However, this advantage is offset by the fact that range information may become ambiguous at higher pulse rate frequencies. Since high pulse rate frequencies are desirable for various reasons it would be advantageous to have a system capable of providing unambiguous range data in a high PRF system. Existing systems eliminate range ambiguities by sequentially transmiting at different PRF's. Two major disadvantages are associated with this approach. First, since the PRF's are transmitted and receiver-processed at different times, there is a chance that the target parameters will change from one look to the next. Secondly, the procedure of using multiple PRF's becomes impractical in the simultaneous presence of several moving targets.

SUMMARY OF THE INVENTION

The invention consists of a novel pulse Doppler radar which is capable of automatically eliminating range and Doppler ambiguities. It is characterized by the transmission of a staggered spectrum and staggered pulse trains and by appropriate processing of the received signal through spectral destaggering by separation into two or more channels and by automatic processing through coincidence or logic circuit techniques to obtain unambiguous range and Doppler information.

OBJECTS OF THE INVENTION

It is therefore an object of the invention to provide a system capable of providing unambiguous range and Doppler information in a pulse Doppler radar.

Another object is to provide such a system which is free from the disadvantages noted with respect to multiple PRF systems.

A further object is to provide a radar system which is of relatively simple design and has a high reliability.

Other objects, advantages and novel features of the invention will become apparent from the following detailed description considered in conjunction with the drawings.

BRIEF DESCRIPTION OF THE DRAWINGS

FIGS. 1(A)–1(D) shows the waveforms present in the system of the invention.

FIG. 2 is a block diagram of the receiver used in the invention.

FIG. 3 shows the line spectra associated with the pulse trains of the system.

DESCRIPTION OF THE PREFERRED EMBODIMENT

Figure 4:
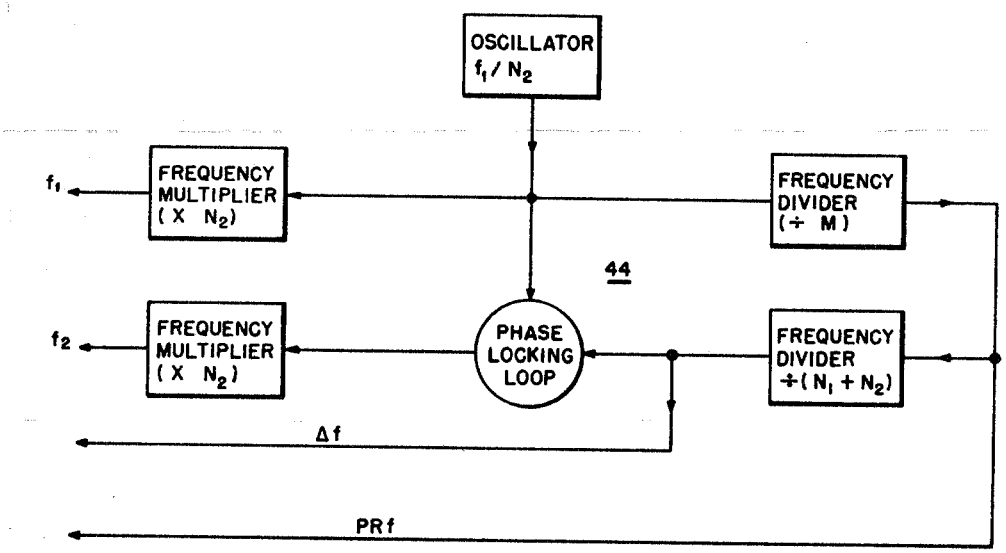
FIG. 4 is a block diagram of an exciter for generating the frequencies used in the transmitter.

As a background to understanding the invention, picture two sine waves of different frequencies being transmitted by two transmitters which are isolated from each other sufficiently such that one wave does not interfere with the other. The phase difference between the waves will be a periodic function, going from 0 to $2\pi$ in a time equal to the reciprocal of the difference of the individual frequencies of the waves. Thus if $f_1$ and $f_2$ are chosen to represent the frequencies of the waves the phase difference will vary from 0 to $2\pi$ in a time equal to $$\frac{1}{f_1-f_2}$$

More specifically, at any point in time $t$ after transmission the phase difference would be given by $$\phi_{(t)} = \phi_0 + (2\pi)\frac{t}{f_1-f_2}$$

where $\phi_0$ is the phase difference at the time of transmission. A generalized graph of such a periodic function is shown in FIG. 1B. Clearly then the phase difference between two sine waves is a function of time and since distance traveled by a wave is a function of time one is able to utilize this phase difference to arrive at distance.

The same general idea is true of the phase difference between a line in one spectrum associated with a pulse train modulated on carrier $f_1'$ and a line in another spectrum associated with a pulse train modulated on carrier $f_2'$ if the pulses of each train occur approximately simultaneously. FIG. 3 is illustrative of such a spectrum and is associated with a waveform shown in FIG. 1A.

FIG. 1A represents the pulse reflections from a moving target. It is seen from FIG. 1A that two time staggered pulse trains are transmitted at two separate frequencies $f_1'$ and $f_2'$. The line spectrum associated with the pulses on $f_1'$ is shown in FIG. 3 with the lines located at $f_1'$ and on each side of $f_1'$ at intervals equal to the PRF. The line spectrum associated with $f_2'$ is shown in FIG. 3 with its carrier at $f_2'$ and lines spaced on both sides of $f_2'$ at intervals equal to the PRF. The entire spectrum of FIG. 3 taken as a whole can be considered as the summation of the two individual spectra. Notice from FIG. 3 that the PRF can be expressed as $(N_1+N_2)\Delta f$ where $N_1$ and $N_2$ are integers and $\Delta f$ represents a frequency difference. A spectrum similar to FIG. 3 can be produced by two high pulse rate frequency transmitters operating alongside each other and having a means for phase locking their carrier frequencies. The practical difficulty with such an arrangement is that interference between the different signals would take place resulting in one composite amplitude modulated signal. One method of avoiding this difficulty is by separating the different carrier signals in time by a slight amount approximately equal to one pulse width. Such a separation in time is accomplished using either one or several transmitters, however, the cost factor would dictate that a single transmitter be used. A transmitting apparatus capable of accomplishing this result will be described below. It is noted here that the time separation of the trains is used only to avoid interference and no definite limitation is placed on this separation. Later an embodiment of the system will be described in which by proper selection of the separation Doppler ambiguities can be eliminated.

Each line in the above noted spectra has associated with it a phase term. The invention is based upon a recognition of the fact that the phase difference between a line in one spectrum noted above and a line in the other spectrum is a linear periodic function of time. The phase difference, as illustrated by FIG. 1B, goes from $-\pi$ to $+\pi$ in a time equal to the reciprocal of $f_1'$ minus $f_2'$. Looking more closely at FIG. 1B it is seen that a target return from a particular range will pass through a particular value of phase difference at a specific point in time. A return from a target at a different range but falling within the same range gate, termed an ambiguous range, would have a phase function similar to that shown in FIG. 1B except for a displacement along the time axis. Thus at the time that the phase difference associated with true range $R_1$, FIG. 1B, is passing through 0 the phase difference associated with ambiguous ranges is passing through a value different from zero. It is on this basis that ambiguous range information is rejected.

The electronic apparatus for utilizing the principles just described to arrive at unambiguous range information will now be described with reference to FIGS. 2 and 3. Target information enters the receiver circuits on line 6. Range gate 7 will pass information originating from true and ambiguous ranges into the filters 8 and 9 during a preselected interval corresponding to a target range. The range gate signal is produced by selectively delaying the PRF as shown in FIG. 2 through delay 16. The waveform into the filters will be of a form shown in FIG. 1A. The center frequency of the filters will be adjusted to pass the $f_1'$ and $f_2'$ lines of the spectra shown in FIG. 3. Since the response time of the filters is chosen to be longer than the period between the pulses the output of the filters will be a continuous sine wave approximately at the filter center frequency. The phase difference between the outputs from the separate filters is measured by meter 10. This phase difference is shown in generalized form in FIG. 1B. The outputs of the filters are also sent to threshold circuits 12 and 13 which will produce an output only when the amplitude of the signals are greater than a preselected value. The coincidence circuits 14 are utilized to provide an output only upon the occurrence of several conditions simultaneously. Upon the occurrence of an output from the coincidence circuits 14, the corresponding target return signal is passed to the display equipment 15. The zero range gate for the display is generated in the exciter. The conditions needed to produce an output from the circuits 14 are that both filter outputs are of a sufficient magnitude as monitored by the threshold circuits 12 and 13, that a particular phase difference value be present and that range gate pulse be present. Upon the simultaneous occurrence of these conditions the coincidence circuits 14 will produce an output, enabling the corresponding target data to be displayed. With a receiver as shown in FIG. 2 the output of the phase meter at a range $R_1$ could be represented by FIG. 1B. The circuit of FIG. 2 is duplicated for each range to be sampled.

Coincidence gating is used to display the range information unambiguously. As previously discussed when range gate $R_1$ is opened the data present may be associated with true range $R_1$ or ambiguous ranges. Only the phase difference function associated with true range $R_1$ will be equal to zero upon the occurrence of an $R_1$ range gate pulse. This is seen from FIGS. 1B and 1C. Ambiguous ranges will have phase functions which pass through zero at the occurrence of a latter $R_1$ range gate pulse and will be appropriately displayed on the radar screen.

By this means the ambiguous ranges are separable from each other through coincidence of a range gate pulse and a particular value of the phase difference function. The system parameters are chosen such that the phase difference signal associated with any one target range present in any range cell passes through one particular value in coincidence with a range gate pulse only once in every $N_1+N_2$ range gate pulses, where $N_1$ and $N_2$ are integers selected such that $N_1$ and $N_1+N_2$ have no common prime factors. As shown in FIG. 3 the PRF is equal to $(N_1+N_2)\Delta f$ where $\Delta f$ represents the frequency of the zero range pulse. The tuning of the filters 8 and 9 to the proper frequencies can be accomplished by changing the resonant frequency of a tuned circuit in accordance with the known Doppler provided from another part of the system. This tuning function can be more efficiently performed by the tuning of a local oscillator according to the known Doppler. The use of zero phase difference as the point of coincidence is a matter of choice and any other value could have been utilized. FIG. 4 shows an exciter capable of generating the proper frequency signals in the system. The exciter insures that the carrier frequency $f_1$ is equal to an integer multiple of the PRF, namely M times $N_2$, times the PRF, where $N_2$ is obtained from criteria above and where M is determined such that the carrier frequencies and the PRF are the desired values. From FIG. 4 we also see that $\Delta f$ is equal to the PRF divided by $N_1+N_2$. The exciter produces four coherently linked sine waves, namely two carriers, the PRF and $\Delta f$. The PRF signal is used in the transmitter to gate out the $f_1$ and $f_2$ oscillations. Both pulse trains together will have the staggered spectrum of FIG. 3. The $\Delta f$ signal is needed for the zero range sweep trigger in the receiver. A preselected phase difference between $f_1$ and $f_2$ is injected into the signals by the phase locking loop. The various derivative signals are formed by dividing and multiplying the oscillator frequency according to the above-mentioned criteria.

Figure 5:
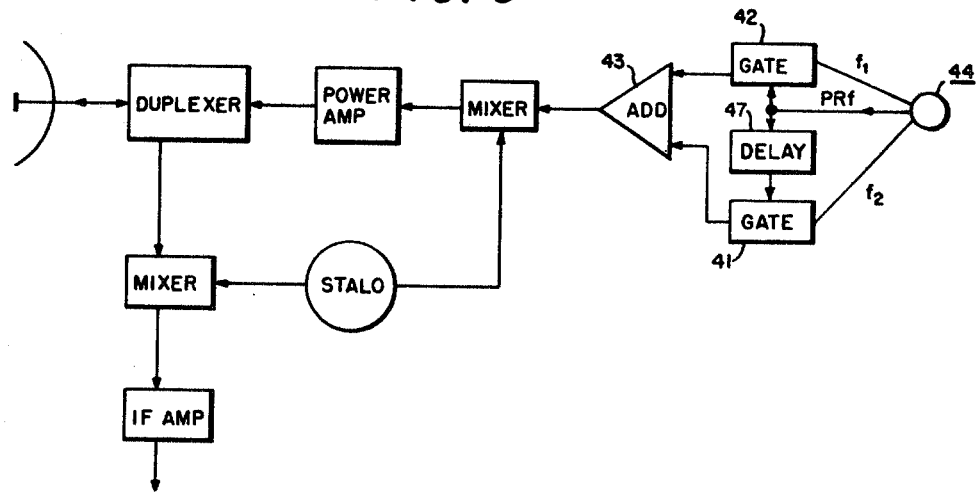
FIG. 5 is a block diagram of the transmitter used in the system.

FIG. 5 shows a transmitter used in the system. The exciter provides the $f_1$ and $f_2$ signals to gates 41 and 42. One of the gates is activated after an appropriate time delay 47 in order that the waves leaving the transmitter do not interfere with one another. The outputs from gates 41 and 42 are summed in circuit 43 before before being shifted to the desired microwave frequency by mixing with a stable local oscillator. The resulting signal is power amplified and transmitted via a duplexer or circulator and antenna. The received signal passes through the circulator into the first mixer where they are mixed down to the first IF, which is in this particular setup, for stationary targets, equal to $f_1$. The first IF amplifier limits the bandwidth to approximately the reciprocal of the transmitted pulse width.

The narrow band filters and range gates shown in FIG. 2 may be replaced by other devices which are usually encountered in pulse Doppler systems such as time compression-frequency expansion devices or one may use a matched filter arrangement.

The system as described up to this point will eliminate range ambiguities but will not necessarily eliminate Doppler ambiguities which may be present. However by properly selecting the time shift T, shown in FIG. 1(A) it is possible to eliminate the requirement for unambiguous Doppler. This would allow the system to use a lower PRF.

Looking at FIG. 3 it is noted that harmonic line pairs adjacent the carriers have an additional phase term. Thus the first harmonic pair has a phase term equal to $$2\pi \frac{T}{R}$$

added to the time variable phase difference between the carriers, where T represents the time shift between the different frequency components of each pulse as shown in FIG. 1(A) and R represents the reciprocal of the PRF.

As shown in FIG. 3, with unambiguous Doppler available, the system is able to monitor the $f_1'$ and $f_2'$ lines. The system would operate as described previously with each range being displayed upon the coincident occurrence of a preselected time and a preselected phase difference. If the PRF is chosen such that the Doppler is ambiguous it is possible that the lines being monitored will be the adjacent harmonics lines rather than the carriers. By choosing the ratio $T/R$ properly it is seen that if adjacent harmonic lines are being monitored the phase difference function of each target will be shifted. Thus coincidence will not occur and the target will not be displayed. The ratio $T/R$ must be selected in reference to the other system parameters such that if the filters 8 and 9 of FIG. 2 are tuned to a frequency other than the true Doppler the coincidence conditions will not occur and the information will not be displayed. It is also possible to identify the true value of the Doppler shift by measuring this additional constant displacement. This could be performed by means of a coincidence technique for example by sensing coincidence between selectively delayed range gate pulses and a specific value of the measured phase function. In summary the radar system disclosed eliminates range and Doppler ambiguities by transmitting a staggered time signal modulated on two different frequencies $f_1$ and $f_2$, with a properly chosen time displacement.

Persons interested in further information concerning the mathematical basis for this invention, and particularly the theory relating to the elimination of Doppler ambiguity, are referred to NRL Report 6651 "Eliminating Radar Ambiguities by Processing Staggered Pulse Trains or Sepctra" by H. H. Woerrlein which is on sale by the Clearinghouse for Federal Scientific and Technical Information, Springfield, Va. 22151 under catalog number AD–667455.

Numerous and varied arrangements embodying the principles of the invention of which the above described embodiment is illustrative will readily occur to those skilled in the art. No attempt to exhaustively illustrate all possible such arrangements has been made.

What is claimed and desired to be secured by Letters Patent of the United States is:

1. A pulse detection system comprising:
    means for transmitting a plurality of pulse trains on the same pulse rate frequency, each train modulated on a different carrier frequency, the spectrum of each of said trains being characterized by frequency lines at said carrier frequencies and on each side of carrier at frequency intervals equal to said pulse rate frequency,
    means for receiving Doppler shifted reflections of said trains from targets including, means for measuring the phase difference between a first frequency line in one of said Doppler shifted trains and a second frequency line in another of said Doppler shifted trains, said phase difference being an indication of target range.

2. The system of claim 1 wherein said transmitting means further includes means for transmitting the pulses comprising each of said plurality of pulse trains simultaneously.

3. The system of claim 1 wherein said transmitting means further includes means for delaying said trains in time, with respect to each other, by an amount sufficient to eliminate interference between said trains.

4. The system of claim 1 wherein said receiving means further includes:
    means coupled to said phase measuring means and said transmitting means for indicating the coincident occurrence at a preselected time after transmission of said pulses and a preselected value of said phase difference, whereby the range of a target is identified by said coincident occurrence.

5. The system of claim 4 further inclding:
    threshold means for inhibiting said indicating means upon the occurrence of a signal on said frequency lines below a preselected amplitude.

6. The system of claim 4 further including display means coupled to said indicating means and calibrated to display target range as a function of the time of said coincident occurrence.

7. A system for detecting the range of a moving target by analyzing pulsed radiation reflected from the target comprising:
    means for transmitting a plurality of pulse trains at the same pulse rate frequency, said pulse rate frequency being sufficiently high to provide unambiguous Doppler information when processed in a receiver, each train modulated on a different carrier frequency,
    a receiver for detecting Doppler shifted reflections of said trains from the same target including means for indicating the Doppler shifted carrier frequency of said trains,
    means coupled to said Doppler shift indicating means for measuring the phase difference between the carrier frequency of one of said reflected trains with another of said reflected trains,
    means coupled to said phase measuring means for indicating the range of the target by determining the time at which said phase difference reaches a particular value.

References Cited

UNITED STATES PATENTS

| | | | |
|---|---|---|---|
| 2,524,050 | 10/1950 | Ginzton | 343—9 |
| 3,229,284 | 1/1966 | Rubin | 343—9 |
| 3,277,473 | 10/1966 | Calhoon et al. | 343—17.1 |

RICHARD A. FARLEY, Primary Examiner

H. C. WAMSLEY, Assistant Examiner

U.S. Cl. X.R.

343—13